US012613702B2

(12) United States Patent
Sartori et al.

(10) Patent No.: US 12,613,702 B2
(45) Date of Patent: Apr. 28, 2026

(54) PROCESSOR AND COMPILER FOR SECURE MULTIPARTY COMPUTATION

(71) Applicant: Regents of the University of Minnesota, Minneapolis, MN (US)

(72) Inventors: John Mario Sartori, Minnetrista, MN (US); Shashank Ganapathi Hegde, Austin, TX (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 18/811,392

(22) Filed: Aug. 21, 2024

(65) Prior Publication Data

US 2025/0068425 A1 Feb. 27, 2025

Related U.S. Application Data

(60) Provisional application No. 63/534,151, filed on Aug. 23, 2023.

(51) Int. Cl.
*G06F 9/30* (2018.01)
*G06F 9/38* (2018.01)

(52) U.S. Cl.
CPC ........ *G06F 9/30149* (2013.01); *G06F 9/3838* (2013.01); *H04L 2209/46* (2013.01)

(58) Field of Classification Search
CPC . G06F 9/30149; G06F 9/3838; H04L 2209/46
See application file for complete search history.

(56) References Cited

U.S. PATENT DOCUMENTS

| | | | | |
|---|---|---|---|---|
| 5,548,761 | A * | 8/1996 | Balasundaram | ........ G06F 8/443 717/110 |
| 2011/0040820 | A1 | 2/2011 | Rane et al. | |
| 2014/0130173 | A1* | 5/2014 | Kerschbaum | ......... G06F 21/125 726/26 |
| 2014/0372769 | A1 | 12/2014 | Kerschbaum et al. | |
| 2020/0090552 | A1* | 3/2020 | Feng | ......................... H04L 9/00 |
| 2020/0304293 | A1* | 9/2020 | Gama | ....................... H04L 9/00 |
| 2020/0336302 | A1 | 10/2020 | Jetchev et al. | |
| 2022/0019441 | A1* | 1/2022 | Rosing | .................. G06F 9/3836 |

(Continued)

FOREIGN PATENT DOCUMENTS

WO 2023071812 5/2023

OTHER PUBLICATIONS

Alessandro Acquisti et al., "The Economics of Privacy," Journal of Economic Literature, 54(2):442-492 (2016).

(Continued)

*Primary Examiner* — Corey S Faherty
(74) *Attorney, Agent, or Firm* — Dicke, Billig & Czaja, PLLC

(57) ABSTRACT

A system for Multi-Party Computation (MPC) includes a general-purpose programming language, an MPC processor, an MPC Instruction Set Architecture (ISA), and a compiler. The general-purpose programming language is used for writing an MPC application. The MPC processor executes the MPC application. The MPC ISA corresponds to the MPC processor. The compiler generates an intermediate representation for the MPC application and generates machine code for the intermediate representation by mapping and assembling MPC ISA instructions.

16 Claims, 4 Drawing Sheets

(56)          References Cited

U.S. PATENT DOCUMENTS

| | | |
|---|---|---|
| 2022/0092172 A1 | 3/2022 | Tsuchida et al. |
| 2022/0247548 A1 | 8/2022 | Boehler |
| 2022/0255731 A1* | 8/2022 | Modica .................. H04L 9/008 |
| 2022/0269798 A1* | 8/2022 | Riazi ....................... G06F 21/53 |
| 2023/0087864 A1 | 3/2023 | Cheng et al. |
| 2023/0155820 A1 | 5/2023 | Wang et al. |
| 2025/0045632 A1* | 2/2025 | Lage Serrano ........ G06N 20/20 |

OTHER PUBLICATIONS

Burhan J. Awrahman, Choman Aziz Fatah, and Mohammed Y. Hamaamin, "A Review of the Role and Challenges of Big Data in Healthcare Informatics and Analytics," Computational Intelligence and Neuroscience, vol. 2022:5317760, pp. 10 (2022).

Amos Beimel, "Secret-Sharing Schemes: A survey," In Y.M. Chee et al., editors, IWCC, Coding and Cryptology, LNCS 6639, pp. Springer-Verlag Berlin Heidelberg, 11-46 (2011).

Richard P. Brent and Hsiang-Tsung Kung, "A Regular Layout for Parallel Adders," IEEE Transactions on Computers, vol. C-31(3):260-264 (Mar. 1982).

World Economic Forum, "The Future of Jobs and skills: Employment, skills and workforce strategy to 2025," Technical Report, pp. 147 (2018).

Kai Huang, Mehmet Gungor, Xin Fang, Stratis Ioannidis, and Miriam Leeser, "Garbled Circuits in the Cloud Using FPGA Enabled Nodes," IEEE High Performance Extreme Computing Conference (HPEC), pp. 1-6 (2019).

Lijuan Luo, Martin Wong, and Wen-mei Hwu, "An Effective GPU Implementation of Breadth-First Search," In Proceedings of the 47th Design Automation Conference, DAC '10, pp. 52-55, New York, NY, USA, 2010. Association for Computing Machinery.

Dirk Merkel, "Docker: Lightweight Linux Containers for Consistent Development and Deployment," Linux Journal, (239):2, pp. 5 (2014). <https://dl-acm-org.ezpl.lib.umn.edu/doi/fullHtml/10.5555/2600239.2600241>.

Jianqiao Mo, Jayanth Gopinath, and Brandon Reagen, "HAAC: A Hardware-Software Co-Design to Accelerate Garbled Circuits," ISCA '23 pp. 13 (Jun. 17-21, 2023). arXiv:2211.13324v3 [cs.AR] Apr. 25, 2023.

Vinod Nair and Geoffrey E. Hinton, "Rectified Linear Units Improve Restricted Boltzmann Machines," Proceedings of the 27th International Conference on Machine Learning (ICML), pp. 807-814 (2010).

Maria E. Nyström, Johan Karltun, Christina Keller, et al., "Collaborative and partnership research for improvement of health and social services: researcher's experiences from 20 projects," Health Research Policy and Systems, 16:46, pp. 17 (2018).

Ling Ren, Christopher Fletcher, Albert Kwon, Emil Stefanov, Elaine Shi, Marten van Dijk, and Srinivas Devadas, "Constants Count: Practical Improvements to Oblivious RAM," In the Proceedings of the 24th USENIX Security Symposium (USENIX Security 15), pp. 415-430, Washington, D.C., (Aug. 12-14, 2015). USENIX Association.

Aditya Shastri, David Wu, Lynn Chua, Ruiyu Zhu, Tal Davidi, Yu Sheng, and Josh Mintz, Private Computation Framework 2.0., White Paper, Meta, pp. 22 (2022).

Andrew Yao., "Yao's Millionaires' problem," Wikipedia, pp. 4 (1982). <https://en.wikipedia.org/w/index.php?title=/Yao%27s_Millionaires%27_problem&oldid=1197835645.

Andrew C. Yao, "How to Generate and Exchange Secrets," Proceedings of the 27th Annual Symposium on Foundations of Computer Science, pp. 162-167 (1986).

Andrew C. Yao, "Protocols for Secure Computations," IEEE, pp. 160-164 (1982).

Roshan Dathathri et al.,"EVA: An Encrypted Vector Arithmetic Language and Compiler for Efficient Homomorphic Computation," Association for Computing Machinery, PLDI, pp. 546-561 (Jun. 15-20, 2020).

Daniel Demmler et al., "Improved Circuit Compilation for Hybrid MPC via Compiler Intermediate Representation," SECRYPT, pp. 8, (2021).

Daniel Gunther et al., "GPU-accelerated PIR with Client-Independent Preprocessing for Large-Scale Applications," Proceedings of the 31st USENIX Security Symposium, pp. 1759-1776 (Aug. 10-12, 2022).

Samuel Steffen et al., "Zapper: Smart Contracts with Data and Identify Privacy," CCS, pp. 2735-2749 (Nov. 7-11, 2022).

Niklas Buscher, M.Sc, Dissertation, "Compilation for More Practical Secure Multi-Party Computation," Technische Universitat Darmstadt, pp. 203 (2018).

Matthew Green et al., "Efficient Proofs of Software Exploitability for Real-world," Proceedings on Privacy Enhancing Technologies, 1, pp. 627-640 (2023).

Alexander Viand et al., "HECO: Fully Homomorphic Encryption Compiler," ETH Zurich, pp. 18 (2022).

* cited by examiner

300

```
if (a > b){          r = a > b ? s : q;
r = s;               t = a > b ? b : a;
t = b;
} else {
r = q;
t = a;
}
```

PROCESSOR AND COMPILER FOR SECURE MULTIPARTY COMPUTATION

CROSS REFERENCE TO RELATED APPLICATIONS

This application claims priority to U.S. Provisional Patent Application No. 63/534,151, filed Aug. 23, 2023, entitled "PROCESSOR AND COMPILER FOR SECURE MULTI-PARTY COMPUTATION" and is incorporated herein by reference.

BACKGROUND

In today's data-driven world, privacy and ownership of data are of paramount importance. There is significant economic value associated with personal data. The global value of private data was estimated to exceed $3 trillion in 2019, and is growing at an unprecedented rate, expected to exceed $7 trillion by 2025. Large corporations are hesitant to share their data but are invested in making business decisions based on insights from combined datasets belonging to two or more corporations. Also, extremely protected data such as medical records protected by Health Insurance Portability and Accountability Act (HIPAA) regulation would need to pass significant regulatory scrutiny before sharing the data with third parties for analysis and research. Secure MultiParty Computation (MPC) systems enable new computational paradigms in which multiple parties jointly compute a function on their private inputs without revealing any information about their inputs.

Software solutions for MPC involve evaluating logic as encrypted logic gates, which incurs significant overhead and communication bottlenecks. Existing hardware acceleration technologies for MPC include garbled circuits, which have significant network and hardware overhead. The typical approaches includes software-based circuit evaluation, which uses XOR-based secret shares to overcome the network challenges of garbled circuit implementations.

However, significant overheads associated with software-based solutions make them infeasible in most practical applications, preventing widespread use of MPC in applications where it could otherwise have a revolutionary impact.

For these and other reasons, a need exists for the present invention.

DETAILED DESCRIPTION

Figures 1, 2:
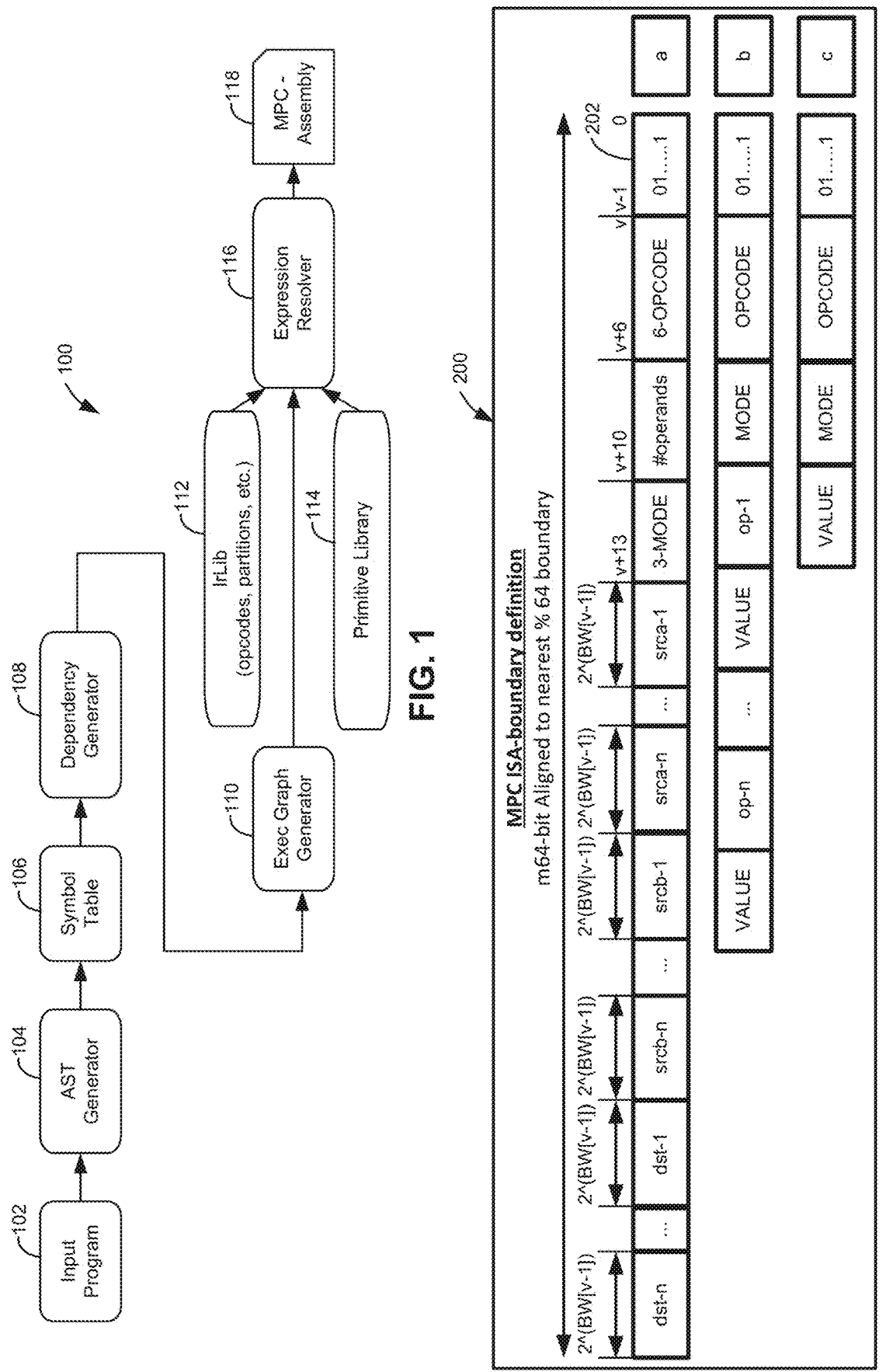
FIG. 1 is a high-level flow for one example of compiling a front-end application in a general-purpose programming language (e.g., Python) into an MPC-friendly representation enabling the assembler to generate optimal machine code.
FIG. 2 is one example of an encoding and boundary description for different classes of instructions that allows vectored instruction with efficient packing.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Disclosed herein is a bespoke processor for XOR Secret share based MultiParty Computation (MPC) that may improve the runtime efficiency by up to about 20000 times compared to the previous MPC approaches. The disclosed bespoke processor for XOR Secret share encompasses a full development and execution framework, including a compiler, an MPC Instruction Set Architecture (ISA), an assembler for the ISA, and a bespoke processor that efficiently executes programs compiled with the ISA.

Secure multiparty computation (MPC) is a cryptographic protocol that allows multiple parties to jointly compute a function on their private inputs without revealing any information about their inputs. This is useful for a variety of modern data-intensive applications, including the following use cases.

Data analytics: Secure MPC can enhance fintech applications like fraud detection, risk assessment, and market research. Consider the scenario where companies aim to enhance their understanding of the market's loan repayment capability. By leveraging MPC, these companies can construct models that incorporate account information for individuals across multiple banks, enabling more accurate and comprehensive market analysis.

Machine learning: MPC can be used to train machine learning (ML) models on private data that are distributed across multiple parties. This can improve the accuracy, generality, and reduce prediction bias of models, as they are trained on larger, more diverse datasets.

For instance, imagine a collaborative effort among healthcare institutions to develop a predictive model for identifying early signs of a particular disease. Each institution holds a portion of the relevant patient data, including medical records, genetic information, and diagnostic test results. However, privacy laws (e.g., HIPAA) prevent the sharing of Protected Health Information (PHI) and place extreme barriers that make extensive collaboration nearly impossible, despite the great benefit to humanity that could come from such research. Through secure MPC, these institutions could jointly train a machine learning model without directly sharing patient information. The resulting model benefits from a larger pool of diverse data, leading to improved accuracy and better predictive capabilities. Furthermore, since MPC maintains privacy of the sensitive datasets, regulatory burden to protect and securely access the datasets can be largely eliminated, enabling more extensive research and development of models involving PHI.

Privacy-preserving computation: MPC can be used to compute functions on data while protecting the privacy of data owners. This can be useful for tasks such as medical diagnosis, financial transactions, advertisement targeting, and voting. Consider an advertising platform (e.g., Facebook) that possesses valuable social profile data and a product company that desires to promote ads on this platform. To optimize the return on investment of their advertising campaign, the product company requires user information that the platform is unwilling to disclose due to privacy concerns. Similarly, the product company possesses user interaction data for their products and conversion details, which could potentially enhance the ad platform's ability to target ads more effectively. In this scenario, the parties can employ secure MPC techniques to develop better predictive models without revealing sensitive user information.

Typical MPC solutions are primarily software-based. These solutions are easily deployable on a general purpose computing platform. However, they suffer from significant performance bottlenecks due to the complexity of the underlying cryptographic protocols and the large cost associated with exchanging a substantial amount of data between the parties. This is particularly true for largescale computations involving many parties, which can result in prohibitive computational and communication overheads.

To overcome these limitations, there is growing interest in exploring hardware-based MPC solutions that leverage application-specific integrated circuits (ASICs) or field-programmable gate arrays (FPGAs) to improve computational efficiency. A key advantage of these solutions is their ability to natively evaluate the wavefront of an MPC application circuit implementation in parallel, as opposed to circuit emulation applied by software solutions, which often evaluate MPC logic bit by bit and gate by gate, not only incurring significant performance overheads, but also consuming significantly more energy. In addition, hardware-based solutions can reduce communication overhead by integrating communication components directly into the hardware, reducing latency and energy associated with data transfer. Furthermore, hardware-based solutions may be designed with security in mind, providing additional protection against side-channel attacks and other security threats, since MPC may be immune to such security vulnerabilities by design.

While typical MPC approaches use or adapt existing computational models to evaluate MPC applications, because the MPC computational paradigm is radically different, existing computational models fail to overcome the bottlenecks and challenges inherent in MPC sufficiently to make MPC feasible for most applications. With this understanding, disclosed herein is an ISA and microarchitecture for a bespoke MPC processor that executes operations as instructions on privacy-preserving MPC hardware units and avoids the significant overheads involved in typical MPC approaches. Still, the benefits made possible by the domain-specific bespoke MPC architecture may only have a significant impact if the software development flow for the processor is accessible to normal programmers. To this end, a software toolchain for MPC processors has been developed that provides a familiar python programming interface, compiler, and assembler that generate performance-optimized executables for python applications.

The steep learning curve for MPC application development limits adoption. Accordingly, disclosed herein is a software toolchain for MPC, including a compiler and assembler that abstract the hardware implementation details and provide a familiar programming interface (e.g., Python), easing technology adoption.

Typical MPC implementations suffer from significant overheads and inefficiencies. Accordingly, disclosed herein is a bespoke ISA for MPC that facilitates efficient hardware implementation.

Performance bottlenecks for typical MPC implementations prohibit adoption for applications that could benefit from private MPC. Accordingly, disclosed herein is a processor architecture for MPC applications. The bespoke MPC processor disclosed herein executes MPC applications produced by the compiler without the need for hardware reconfiguration used in prior approaches. Orders of magnitude performance improvement compared to the typical approaches can enable the use of MPC in new application domains. In addition, hardware optimization geared towards communication reduction and logic simplification further reduces runtime and network utilization by up to about 4 times.

XOR secret sharing (XOR-SS) is a fundamental building block of many MPC systems. The parties each hold a share of a secret consisting of a random value, and they collaborate to compute a function on their private data by sharing their shares. To reconstruct the secret, the parties collectively perform an XOR operation on their shares.

XOR-SS can be used in many MPC systems, including secure function evaluation, secure MPC, and secure two-party computation. The security of these systems relies on the fact that no subset of parties smaller than a threshold can learn anything about the secret, and that the parties can perform computations on the secret without revealing anything about their private data.

In MPC systems, parties compute functions cooperatively. To allow a full variety of computational functionality, the system should be functionally complete. A functionally complete set of logical connectives is one that can be used to express any possible function through a boolean expression of set members. There are many different sets of operations that are functionally complete. For example, one common functionally-complete set of logic connectives is {AND, OR, NOT}; any logic function can be realized using only these three connectives. XOR-SS uses the functionally complete set {XOR, AND} to implement an arbitrary logic. The reason for this choice among many options is that the MPC XOR operation can be computed independently and privately without the need for communication among the parties during computation, thereby reducing overhead. Performing the AND operation, however, requires inter-party communication (IPC) to be interleaved with the computation.

The XOR can be computed in MPC without data exchange during the computation. Each party contributes their share prior to the computation, and the shares are combined in such a way that the secret can be reconstructed only if a sufficient number of parties participate.

It is important to note that the operation can be performed independently by both parties without communication because the XOR is reversible. Thus, XOR can be computed locally without any external communication to another party during the computation. An illustrative example is shown below.

$$\text{share}^1{}_a = A \oplus R_a \qquad (1)$$

$$\text{share}^2{}_a = R_a \qquad (2)$$

If an XOR operation is again performed with the $R_a$, the A can be recovered.

$$A = \text{share}^2{}_a \oplus \text{share}^1{}_a \qquad (3)$$

Unlike XOR, AND is not reversible; an AND operation on two inputs loses information about the inputs. Even if one input and the output is known, the other input cannot be recovered. Hence, it requires back-and-forth communication to be interleaved with the computation, as discussed below.

As noted above, XOR can be computed without interleaving commination in the computation because the XOR operation is reversible. However, this is not true for the AND function, and thus, parties must communicate intermediate terms to complete an AND function. One way to perform this computation is with Beaver triples.

A Beaver triple is a tuple of three values (a, b, c), where a and b are random shares of two inputs, and c is the XOR of the product of the two inputs and a random value r. Beaver triples can be precomputed and shared among the parties, so that they can be used as building blocks for evaluating boolean circuits.

When using Beaver triples, 2 bits are exchanged between two parties to realize a 1-bit AND. In general, parties exchange 2N bits for N-bit AND in a 2-party system and 2NM bits in an M-party system. Because it requires considerably more communication than XOR, AND is considered expensive.

Typical MPC approaches are implemented as custom logic circuits, constructed from a functionally-complete set of security-enhanced logic primitives. The underlying cryptographic techniques involve translating an application into an equivalent circuit that ensures the privacy and security of a collaborative computation among multiple parties while preserving the confidentiality of each party's inputs. Fundamental MPC approaches include Garbled Circuits (GC) and Secret-Sharing (SS); both involve representing and evaluating an application as a circuit constructed from a functionally-complete set of privacy-preserving logic primitives. The circuit-based approach supports the composition of complex functions by combining smaller circuits or gates. This enables the construction of more intricate computations using a modular and scalable approach. Homomorphic Encryption presents another way to perform private computation; however, the approach is limited to one party.

Garbled Circuit (GC) in the cloud using enabled nodes provides an end-to-end implementation of GC that includes a garbler and an evaluator implemented on separate FPGAs. Garbled circuits, in general, are computationally expensive, as the truth table of the gates is encrypted (e.g., using SHA-1). Additionally, the accelerator uses a gate evaluation table, and the hardware evaluates a fixed circuit. This approach does not scale well, especially for problems in which an entire application and input stream cannot be laid out as a stream of logic gates at compile time.

Hardware-Software Co-Design to Accelerate Garbled Circuits (HAAC) presents a co-design strategy to enhance GC performance with a customized compiler and dedicated hardware accelerator. The HAAC compiler facilitates the expression of GCs as multiple streams, enabling parallel processing of GCs through specialized hardware units known as gate engines (GEs). The implementation of HAAC relies on the Bristol netlist generated by EMPToolkit.

HAAC uses breadth-first traversal of gates to evaluate dataflow paths on GEs. However, as application size grows, the number of gates also increases, resulting in significant overhead associated with wireId and encrypted gateId management. Building and evaluating custom logic circuits for an application involves significant bookkeeping overheads like loading the circuit graph, evaluating the gates, and propagating signals through the circuit graph. Bookkeeping overhead becomes more pronounced as application or data size or complexity grows.

MP-SPDZ preprocesses an MPC application by compiling the application into bytecode, synthesizing the bytecode into boolean logic for a selected MPC protocol, and emulating the logic in a virtual machine that supports about 30 MPC protocol variants to target a variety of security models, including honest/dishonest majority and semi-honest/malicious corruption. MP-SPDZ mixes boolean logic-based MPC protocols such as GCs and GMW with arithmetic circuit-based protocols, based on application demands. While the framework disclosed herein can support multiple MPC protocols, the focus of this disclosure is a general-purpose processor (GPP) for MPC that executes MPC applications without the need to implement or evaluate application-dependent protocol-based circuits. The disclosed processor architecture and ISA can be extended to support any MPC protocol, as protocol-specific information in the MPC ISA is not encoded. This allows the compiler to optimize the instruction sequence for a selected protocol. The disclosed architecture could also support multiple protocols per application on the same MPC processor. Additionally, because the disclosed MPC implementation is based on bespoke hardware rather than software emulation, the performance with respect to MP-SPDZ can be significantly improved.

Piranha accelerates previous approaches on 2-, 3-, and 4-party arithmetic-SS on a GPU, achieving nearly 33 times speedup over a CPU-based implementation. Arithmetic-SS supports integer-based computations and does not require circuit emulation like boolean logic-based MPC protocols; however, arithmetic-SS degrades accuracy and is only applicable for applications that can tolerate inaccuracies in the input data. Also, the protocol is less secure and is vulnerable to side-channel attacks. XOR-SS, on the other hand, is unconditionally secure, and because the current disclosure uses a bespoke processor for MPC, better performance can be achieved, even using XOR-SS.

PPMLAC accelerates privacy-preserving (PP) ML using a trusted third-party chip per party to perform PP arithmetic-SS operations. The approach substantially reduces the IPC required in MPC. Since the approach relies on a trusted computing environment and arithmetic-SS, it is subject to the vulnerabilities and limitations inherent in those techniques.

HyCC introduces a toolchain that compiles an application into a hybrid MPC protocol that combines arithmetic-SS, GC, and GMW. HyCC selects an appropriate MPC protocol based on application requirements, making it more accessible to developers with limited cryptographic expertise. It is important to note that HyCC compiles an application into circuits that manifest hybrid protocols. Supporting and switching between multiple protocols in hardware necessitates significant overhead and hardware complexity, and as such, HyCC is not very hardware-friendly.

Private Computation Framework (PCF) is a XOR-SS implementation of MPC that overcomes the fixed circuit limitations of prior approaches through just-in-time (JIT) compilation. In PCF, an MPC application is compiled into a circuit of MPC XOR and AND gates and evaluated via software emulation. Applications are evaluated with an MPC backend, which functions akin to a virtual machine. PCF provides an open-source MPC implementation that is used in industry to perform MPC on advertisement data. The approach involves several significant overheads. For one, JIT compilation is used to translate an application, input data pair into an equivalent circuit. The circuit is formed by overloading C++ operations (+, −, |, &, >, <, >=, <=), and the application is written in heavily-templated C++. Application code and input data must be compiled together with the entire library framework before execution. Circuits are formed at runtime, topologically sorted, and gates are evaluated through software emulation. Another potentially limiting requirement is that the entire circuit must fit in the main memory. Conceptually, circuit decomposition techniques might be used to overcome this limitation, but existing works have not proposed this. Since the current disclosure breaks an application into instruction streams, the computation can be processed as a stream of instructions, as in a GPP. As such, an application's entire circuit does not need to be loaded simultaneously for evaluation. Also, the current disclosure allows data-dependent control flow, which is not possible on a fixed set of gates.

Due to the challenges inherent in performing collaborative computation while maintaining the privacy of all parties involved, typical MPC implementations are subject to various limitations, including significant communication bottlenecks, scheduling inefficiency for circuit evaluation, runtime overhead due to JIT-like compilation, memory and execution overhead management, inefficiency of existing circuit evaluation techniques, and domain expertise needed for custom MPC application specification. While many existing applications could benefit (sometimes quite significantly) from secure MPC, the limitations of typical approaches preclude its use for most applications.

Accordingly, disclosed herein is an MPC architecture that addresses the limitations of typical MPC approaches, with the goal of enabling MPC for a much wider range of applications. The instructions in the bespoke MPC processor disclosed herein are evaluated on logic that is synthesized from MPC logic gates (e.g., XOR, AND), but unlike previous MPC implementations, the processor is architected in the style of a general-purpose processor (GPP) so that the hardware need not be regenerated if the application or input changes. Described below is the MPC architecture, along with the software toolchain that has been developed to allow average developers to write MPC applications without domain-specific expertise. Below, a comprehensive exploration of the design and functionality of the compiler, assembler, instruction set architecture (ISA), and hardware microarchitecture constituting the framework is described.

One substantial bottleneck that prevents widespread adoption of MPC is the learning curve required to develop an MPC application. Due to their inherent complexity, designing MPC applications using typical approaches demands a considerable investment. Thus, an approach is needed that ensures ease of use, easy adaptation, and scalability. To this end, the secure MPC framework of the current disclosure is described below.

First, a general-purpose programming language (e.g., Python-based) application frontend for developers to write applications is provided, allowing easy adoption. Although Python is an interpreted language, only its syntax and fundamental data types are used for compilation. A few syntax rules are added to assist the compiler in generating efficient MPC code. These rules, which are used to specify data bitwidth, help the compiler and assembler identify hardware units to optimize performance. One reason for these rules is that when operating with secret shares, there is no way to assess the bitwidth of the data type, as the values are XOR-encrypted. This approach simplifies application writing for developers who do not want to learn a new, foreign framework for describing front-end applications. Python's language parser and syntax tree generator may be leveraged to implement the compiler.

Second, the ability to evaluate vectored expressions is provided. In typical MPC implementations, every individual bit is represented by a separate Bit type variable, regardless of whether or not the bit is batched with others. This approach leads to suboptimal processor or emulator utilization, since tracking each bit requires significant overhead. To address this issue, the compiler aims to reduce this overhead at both the emulator and hardware levels by using symbols that consist of a value and its status as the base type, thereby minimizing the bookkeeping overhead. Since prior work accesses each bit separately, a processor with 64-bit addressing and 64-bit registers would need 64×64 bits to track one 64-bit value. Since herein tracking is by symbols and their internal bit-status, the disclosed implementation incurs only 64 bits of status overhead for every value.

Third, the execution graph is reassembled to achieve parallelism. Prior work on PCF simply evaluates expressions at the gate level, making the concept of read/write dependency immaterial. As such, the independent logical paths can be identified by performing a topological sort and issuing independent objects in parallel. However, with the disclosed higher-level description of the application in Python, it should be ensured that control and data dependencies are handled correctly. Algorithm 1 below, for example, describes in more detail how the compiler manages the dependency graph.

---

Algorithm 1: High-Level Flow for Compiling Front-End
Application into MPC-friendly Intermediate Representation

---

```
1: Initialize symbol table
2: Generate initial syntax tree using Python AST
3: Extract abstract syntax tree
4: Break down the graph into sections
5: for all sections do
6:      Build symbol table of variables
7:      Generate dependencies for section based on discovered entry
        point
8:      Identify independent statements
9:      Build execution graph for section using dependency graph and
        reordering
10:     Generate groups of instruction that could be evaluated in parallel
11:     Assign group ID and instruction ID
12:     Perform interpretation of expressions
13:         Assign primitive types necessary to evaluate the
        expression and set statuses of the symbols based on the
        dependency graph and symbol scope
14:         Reorder the instructions
15: end for
16: Reorder sections
17: Output: Intermediate representation of the instructions
that can be consumed by the assembler to generate the MPC
machine code and assembly listing
```

---

Finally, an Intermediate Representation (IR) of the datapath is generated so that the assembler can perform hardware-specific optimizations based on hardware configurations and constraints. Using an IR allows optimization of the machine code for different bespoke MPC hardware implementations. Some hardware optimizations are described below. Once all control and dataflow dependencies are resolved, every datapath can be segmented into threads until the point where they converge. This simplifies the process of achieving parallelism and significantly enhances scalability.

The high-level compilation flow is defined for the disclosed approach in two steps. The first step involves parsing and generating an IR of the input program. The next step is to generate machine code for the IR by mapping and assembling the MPC ISA instructions. The overall compilation flow is depicted in FIG. 1. FIG. 1 includes an input program 102 to provide input to an Abstract Syntax Tree (AST) generator 104. The output of the AST generator 104 is input to a symbol table 106. The output of the symbol table 106 is input to a dependency generator 108. The output of the dependency generator 108 is input to an execution graph generator 110. The output of the execution graph generator 110, a library IrLib 112 (e.g., opcodes, partitions, etc), and a primitive library 114 is input to an expression resolver 116. The output of the expression resolver 116 provides an MPC assembly 118. The assembler further optimizes the machine code generated in the previous step to encourage communication reduction by efficiently using the hardware structures and caching intermediate results, with the goal of improving overall system performance. Algorithm 1 above describes the process of generating the assembler-friendly IR.

The need for a new ISA for MPC arises due to certain limitations of typical ISAs. First, certain instructions, such as arithmetic operations, are inherently computed bit by bit, necessitating communication between the parties for each bit of the computation. For instance, N-bit addition using a ripple-carry adder backend would require an N-round trip, resulting in a significant communication overhead. This holds true for any instruction that uses non-free gates. Non-free gates refers to a gate or group of gates that requires inter-party communication to evaluate (e.g., AND gates).

Second, typical ISAs are limited in handling MPC instructions, since the number of registers is limited, and it is inefficient to keep swapping the working set with the cache or lower level memory to compute N-bit operations. Note that in MPC, the result for an instruction may not be obtained in one cycle, due to the requirement to perform communication for every bit. The ISA disclosed herein can address these limitations to enable efficient MPC.

An expanded working set comprising registers and caches that can track the status of each bit is used. This approach enables scheduling of portions of instructions as data become available. For bit-level tracking, disclosed herein is a symbol table that is analogous to the symbol table generated by a compiler. This symbol table is partitioned for each section of the program space, comprising loops, functions, and programs, based on the granularity of branching within the high-level application code.

To incorporate symbols into the instructions, an encoding scheme is used. Additionally, aggregating independent operands within a single instruction holds the potential for parallel execution on the hardware. Thus, disclosed herein is an example encoding scheme that facilitates variable-length instruction coding and is designed to support multiple operands simultaneously and enable the specification of operand bitwidths using MODE bits. FIG. 2 presents an outline 200 of different instruction classes and their boundaries. The example encoding scheme is outlined below. In other examples, other encoding schemes may be used.

The block 202 in FIG. 2 represents a variable-length thermometer-encoded variable that specifies the length of the instruction in multiples of 64-bits.

The OPCODE is a 6-bit field (which was selected so that the instruction set can be extended), and its encoding varies based on the opcode in use. At least 32 instructions are supported, with headroom provisioned to add an additional 32.

The #operands field occupies four bits, and the MODE field contains three bits that specify the bitwidth of each operand. The srcA, srcB, dstA, and dstB fields all have the same bitwidth: $2^{MODE}$. The MODE field plays an important role in optimization, as it allows certain arithmetic operations to be limited to a smaller bitwidth, thereby reducing the amount of IPC required.

MODE=0b111 is a special case in which the operands are considered public, and thus, instruction execution does not require communication and follows a normal execution pattern. Therefore, MODE specifies the granularity to work on datasets, from 1-bit to 64-bit, providing the compiler with flexibility to aggressively perform optimization to minimize communication and enhance performance where possible.

A VALUE field is incorporated that is reserved for certain opcodes, such as fencing or synchronization instructions.

All operands in classes A.x and B are symbol-IDs that are addressed by the preset addressing mode of the compiler. Thus, addressing mode can be configured at the compiler level based on hardware and application complexity. In some examples, the symbol table is a 16-bit addressed symbol table. As such, bitwidth is four. Accordingly, an efficient and flexible instruction encoding scheme is provided that enhances the overall performance of the instruction set. Instructions are divided into classes, as described below.

Class A.1: 3-operand: Logical and arithmetic operations
Class A.2: 4-operand: A special case of A.1 for ternary operations, arithmetic operations with N, Z, C, V update
Class B: 2-operand: Mainly for memory and control flow operations {Load, Store, Set, Reset, jumps, conditional branches}
Class C: no-operand: Instructions such as fence and nop, used for synchronization.

Several key insights related to instruction processing have been identified in the context of MPC, which are listed below.

1. To improve performance, instructions that can run in parallel are grouped. Fetch logic is configured to create instruction groups which are dispatched to parallel units for execution.

2. However, there can be dependencies between different instruction groups, such as Read after Write (RAW) or Write after Read (WAR). To address these, a limited number of symbols are identified on which such dependencies exist. In cases where there is a circular dependency, groups may not proceed, and barriers are added to govern when operations can proceed. In such situations, a Fence instruction is used between groups.

Figures 3, 4:
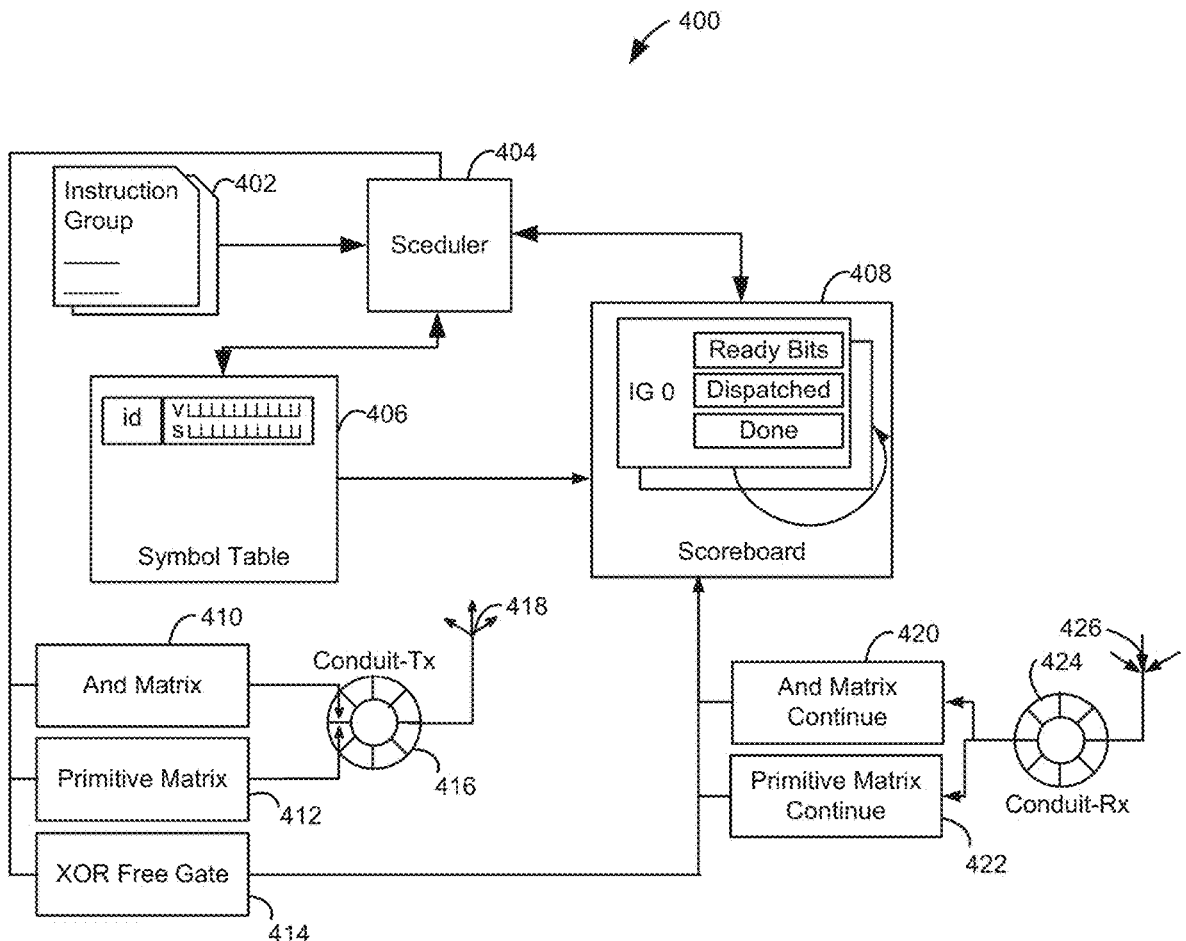
FIG. 3 is one example of conditional branching statements that are grouped as ternary operations based on the condition.
FIG. 4 is an architecture diagram of one example of an execution unit.

3. Conditional branching is a special case of execution that can be realized via instruction predication. FIG. 3 is one example of conditional branching statements 300 that are grouped as ternary operations based on the condition; the assembler implements >, <, >=, <= as a part of a subtract operation where the N, Z, C, V flags can be reused to evaluate different conditional outcomes without having to re-evaluate the conditional outcome for every different condition involving the same result. This reduces the amount of communication required. In the case of encrypted results, for instance, the result of (a>b) in FIG. 3 would be encrypted, and there would be no way to determine which execution path should be taken, making it impossible to determine which group of instructions to execute in the conditional block. This issue is addressed by using instruction predication to select the value determined by the result of the condition, which would still be encrypted. A detailed implementation of this approach is discussed below with reference to the hardware architecture.

4. Finally, certain instructions such as conditional statements process all bits before a control decision is made. E.g., to evaluate (a+b)>5, all non-revealed results of the sum are computed, then the results of the final (a+b−5) is computed to evaluate the condition of the result. To address such situations, Fence instructions are used to ensure that all the bits of one instruction group are computed before the next group can be scheduled. There could be many statements within an if block. As shown in FIG. 3, the result of the condition (a>b) is common for the two statements and can be determined by the N, Z, C, V flags after performing a−b. Thus, the processor waits for a−b to complete before assigning r, t.

By addressing these key points, an efficient, flexible instruction encoding is provided that enhances the instruction set performance in the context of MPC. Next, the design of a bespoke processor that implements the MPC ISA is described. Creating a GPP from MPC logic primitives that implements the ISA allows the same processor to be utilized for any MPC application, as opposed to building, optimizing, and evaluating a custom circuit for each application, as in previous approaches. Now, an MPC application need only be compiled into the disclosed instruction set and executed on the disclosed bespoke MPC processor.

The hardware microarchitecture for the MPC processor enforces synchronization between parties involved in the MPC for every bit in the non-free gates. Similar to a typical GPP architecture, the pipeline abstraction of the disclosed bespoke MPC processor includes Fetch, Decode, Issue, Execute, and Write-Back stages. The Fetch stage incorporates an elastic fetch unit capable of extracting multiple instructions until a fence is encountered. The Decode stage works in conjunction with the fetch stage to generate instruction groups. The Issue stage creates symbol table entries and dispatches instructions to be executed. The Execute stage features a scoreboard that manages the execution status of instruction groups, facilitating instruction dispatch to processing elements, namely the XOR-matrix, AND-matrix, and primitive library. In Write-back, as the status of all bits of a result symbol are marked as done, the result is written back to the appropriate destination.

The fetch unit attempts to group instructions until a fence is encountered, relying on the compiler to order instructions such that they can be executed in parallel without circular dependencies until the fence. It is important to note that hardware resources should not be exhausted, i.e., an appropriate stalling mechanism is needed to observe structural hazards. E.g., if there are m adders and m addition instructions without circular dependencies, all m instructions can be scheduled in parallel. However, for subsequent scheduling of add instructions, the fetch unit stalls or re-orders instructions to resolve the structural hazard. The decode and fetch stages work cooperatively until a circular dependency is detected and all instructions are fetched into a group. The compiler and assembler are responsible for ordering instructions such that groups are formed easily; although the IR of the instructions contains group-ID, the IDs are not packed into the machine code, and hardware forms its own groups. This reduces instruction size and allows hardware grouping to be optimized based on resource availability or microarchitectural implementation. Once a group is dispatched, its progress is managed at the group level rather than the instruction level, which reduces bookkeeping overhead.

A conduit mechanism of the microarchitecture for the disclosed MPC processor enforces synchronization between parties for every bit in the non-free gates. To manage IPC, an abstraction called Conduit is introduced. Instructions are executed by a processing element matrix that is called the Primitive matrix—a gate-level implementation (using MPC primitives) of several structures that support both arithmetic and logical operations. Every structure that involves non-free gates communicates intermediate terms through the conduit to other parties by serializing the data. Based on structure type and ID, partial results are inserted into a circular buffer to preserve the order of operations. As shown in FIG. 4, the receiver conduit can receive its share of the partial result asynchronously. It is important to note that the received order is known and guaranteed. Upon receiving a partial result from another party, the corresponding operation will continue for each primitive in the order it was queued to the conduit.

The transmitter side of the computation can be decoupled from the continueOp circuit. This would incur additional storage overhead and require a context switcher, but decoupling would allow scheduling of more operations while other operations are in transit and/or executing.

FIG. 4 is an architecture diagram of one example of the execution unit 400. The execution unit 400 includes an instruction group 402, which is input to a scheduler 404. The scheduler communicates with a symbol table 406, a scoreboard 408, an And matrix 410, a primitive matrix 412, and an XOR free gate 414. A transmit conduit 416, which transmits data to other parties/processors as indicated at 418, communicates with the And matrix 410 and the primitive matrix 412. The XOR free gate 414, an And matrix continue 420 and a primitive matrix continue 422 provide input to scoreboard 408. A receive conduit 424, which receives data from other parties/processors as indicated at 426, provides input to And matrix continue 420 and primitive matrix continue 422.

The scheduled instruction that needs communication is put on the conduit in order and transmitted to the other party. Upon receiving the partial terms from the other party, corresponding operations continue their operation. Finally, upon completion, the status bits are updated in the scoreboard. Therefore, as shown in FIG. 4, since instruction status is tracked at the group level, the execution unit is designed with a scoreboard that tracks the progress of each bit of an instruction group. The unit is composed of sub-modules, with the scheduler responsible for routing operands to the appropriate processing element; each processing element is responsible for putting its partial results on the Conduit so that the total buffer order is maintained. As partial computations are received from another party, the corresponding operation continues, and finally, done bits are updated in the scoreboard. Algorithm 2 below depicts the scheduling algorithm and how the scheduler plays its role in the life of an instruction group. Note that the done queue is cleared once the section of the instruction goes out of scope or the same instruction is rescheduled.

The running queue in the MPC processor tracks instructions that occupy a hardware unit, while the waiting queue tracks instructions that are yet to be dispatched or are waiting on communication. The waiting queue allows structural dependencies to be cleared when instructions are waiting on communication.

Algorithm 2: MPC scheduler algorithm

```
1: waiting_queue← initialize empty Queue( )
2: running_queue← initialize empty Queue( )
3: done_queue← initialize empty Queue( )
4: //Decoder puts the instruction group in the waiting queue
5: for all inst_group in waiting_queue do
6:      load/create scoreboard entry
7:      inst_group→reconfigureReadyBits( ) //configures the status bits
         for the instruction group to identify if any instruction could be
         scheduled
8:      if bitCount(inst_group→readyBits) > 0 then
9:            for all inst in inst_group do
10:                 if inst is not done then
11:                       status←assign processing element
                          //If the operation is not complete and needs
                          communication
12:                       if status in ScheduleStatus::kNeedsComm
                          then
13:                             //Processing Elements route the
                                intermediate results to the Conduit,
                                scheduler does not handle this
                                logic.
14:                             running_queue→add(inst)
15:                       else if status in SchedulerStatus::kSuccess
                          then
                                {//Operation finished for the
                                scheduled bits successfully, update
                                status}
16:                             updateDstXStatus( )
17:                       end if
18:                 end if
19:                 updateGroupStatus( )
20:            end for
21:            group_status← getGroupStatus( )
22:            //check if all bits of all the instructions are completed
23:            if group_status in GroupStatus::kDone then
24:                  done_queue→add(inst_group)
25:            else
26:                  waiting_queue→add(inst_group)
27:            end if
28:      end if
29: end for
30: //continue running the instructions if communication from other
parties is received
31: for all inst_group in running_queue do
32:      inst_group->continueOp( )
33: end for
```

Due to fundamental communication bottlenecks in an MPC system, application parallelism, and their impact on performance, the running and waiting queues should be appropriately sized to maintain peak application throughput, as adequate instruction-level parallelism (ILP) is a key to overcoming communication latency, and an undersized queue can throttle parallelism and performance.

Selection of an appropriate waiting queue size depends on processor frequency, dispatch throughput, and significantly, network speed. Given a k-bit operation and assuming a dependency chain between successive bits of the result (e.g., carry propagation in an adder circuit), computation of the individual instruction would stall for every bit to perform IPC; however, to improve throughput, instructions can be dispatched in parallel or in a pipelined fashion until a barrier is reached. Simply increasing pipeline depth will not improve throughput beyond a certain threshold, since instructions will not make progress until continueOp is triggered, i.e., partial terms are received from another party. As such, for slower networks, increasing waiting queue depth can allow more in-flight instructions, prevent stalls, and improve throughput. Similarly, for applications with more available parallelism, a deeper waiting queue can increase ILP and throughput.

Selection of an appropriate running queue size depends on the scoreboard size, number of available execution units (hardware parallelism), as well as expected application parallelism. Scoreboard keeps track of dispatched instruction groups, so peak scoreboard capacity depends on the number and width of execution units and interconnect size (hardware parallelism), and actual scoreboard utilization depends on ILP (application parallelism). Increasing the running queue length would allow additional scoreboard instruction groups to be dispatched. Thus, scoreboard and running queue sizes are closely coupled and should be sized to accommodate expected application ILP, as improving ILP will allow communication latencies inherent in MPC-style execution to be covered more effectively.

Inter-party communication during computation imposes a bottleneck for MPC applications. Thus, to reduce communication overhead, disclosed herein are a few hardware primitives from which other logical operations are derived and optimize the low-level design to reduce (e.g., minimize) the number of operations that require communication.

Adder and Subtractor: ADD and SUB instructions, apart from serving the purpose of addition and subtraction, also serve as the base for many conditional instructions. Every instruction involves a custom logic design that is ultimately synthesized into a network of AND and XOR gates. However, the communication requirements of MPC operations should be considered carefully to optimize the logic. For example, an N-bit ripple-carry adder (RCA) requires N serial carry computations. This may increase end-to-end latency when compared with a parallel structure like the kogge-stone or brent-kung adder which would take log(N) steps to converge. However, as bitwidth increases, the number of cascaded AND operations for the generate and propagate phases of the higher-performance adders also increases significantly.

TABLE

Analysis of AND gate complexity with different Adders

| 4-bit Adder | #AND Gate | #OR operation | Total ANDs |
|---|---|---|---|
| Ripple Carry | 4 | 0 | 4 |
| Brent Kung | 20 | 12 | 32 |
| Kogge Stone | 14 | 6 | 20 |

The Table above compares the AND gate complexity for various adders and shows that although RCA has a longer critical path, it has significantly fewer ANDs on the critical path and therefore reduces communication bandwidth requirements. Thus, RCA is selected for this implementation. An N-bit RCA can be realized, in general, using only N-AND gates by using the following formulation.

$$\text{sum}_i = a_i \oplus b_i \oplus c_{i-1} \tag{4}$$

$$c_i = a_i \cdot b_i + a_i \cdot c_{i-1} + b_i \cdot c_{i-1} \tag{5}$$

This requires three AND gates and two OR gates. However, carry can be re-written as:

$$c_i = ((a_i \oplus c_{i-1})(b_i \oplus c_{i-1})) \oplus c_{i-1} \tag{6}$$

This reduces the AND usage to one gate per bit. Also, as the hardware supports pipelining an arithmetic instruction; if an output bit from the previous instruction is an input in the next instruction, it is automatically forwarded. This is particularly possible if the output can be obtained bit by bit. For the divide operation, however, this is not possible because the computation of quotient and reminder is not sequential from least significant bit to most significant bit.

To optimize MULT, the Wallace Tree may be selected. Notable reasons for this choice include the shorter critical path depth (O(log N)), as well as its lower requirement for adders in comparison to alternative architectures like Braun and Dadda. The disclosed design philosophy prioritized the simplification of adder units, each comprising a single AND gate, leading to a streamlined critical path of (O(log N)+1). This architectural choice not only accelerates computation but also minimizes hardware complexity. Furthermore, to facilitate seamless pipelining and enhance throughput, the disclosed system dynamically generates the partial product matrix as soon as a new bit from either source operand becomes available. This adaptive strategy ensures continuous operation, optimizing performance within the MPC paradigm.

Another optimization that is built into the assembler is the tracking of N, Z, C, V flags. These are used not only to track the outcome of arithmetic instructions, but also to determine branch outcomes. However, tracking these flags uses additional logic. For instance, the Z flag is computed as $\{\sim|sum\}$, which translates to the negated output of (N−1) OR gates (where an OR gate is implemented as $(a \cdot b) \oplus (a \oplus b)$). Since OR is implemented using AND, this requires communication overhead. Based on the application constraints, however, the assembler can identify instructions for which flags will not be necessary, and such instructions can be mapped to an alternate hardware unit that does not compute flags. As such, overhead is only incurred when necessary.

Conditional instructions may be implemented using MUX as a primitive. Since values are XOR-encrypted, the result of a condition is unknown, even at run-time, making it impossible to execute a branch instruction in a traditional sense. Instead, to handle such a situation, the ternary operator is used which, as shown in FIG. 3, essentially translates to a 2:1 MUX. The MPC implementation is described as follows:

$$result = (compositeAND((A \oplus B), choice) \oplus A) \quad (7)$$

In Equation (7), choice is a single bit, while A and B are N-bit words. Accordingly, four bits of data are exchanged between the parties to compute one AND result. However, since the choice bit is common, special tuples can be generated with fixed b, such as $(a_1, a_2) \cdot b = (c_1, c_2)$, and thus, only n+1 bits are needed to be transferred from each party. This AND operation is called a compositeAND.

Figure 5:
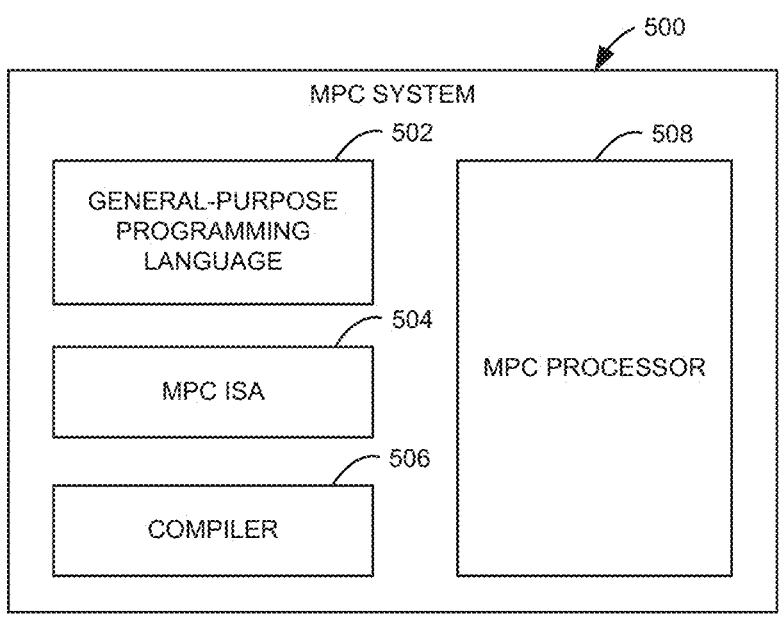
FIG. 5 is a block diagram illustrating one example of an MPC system.

FIG. 5 is a block diagram illustrating one example of an MPC system 500. As previously described above, the MPC system 500 includes a general-purpose programming language 502, an MPC ISA 504, a compiler 506, and an MPC processor 508. In summary, the general-purpose programming language (e.g., Python) 502 is used for writing an MPC application. The MPC ISA 504 corresponds to the MPC processor 508. The compiler 506 is used to generate an intermediate representation for the MPC application and to generate machine code for the intermediate representation by mapping and assembling MPC ISA instructions. The MPC processor 508 is used for executing the MPC application.

Figure 6:
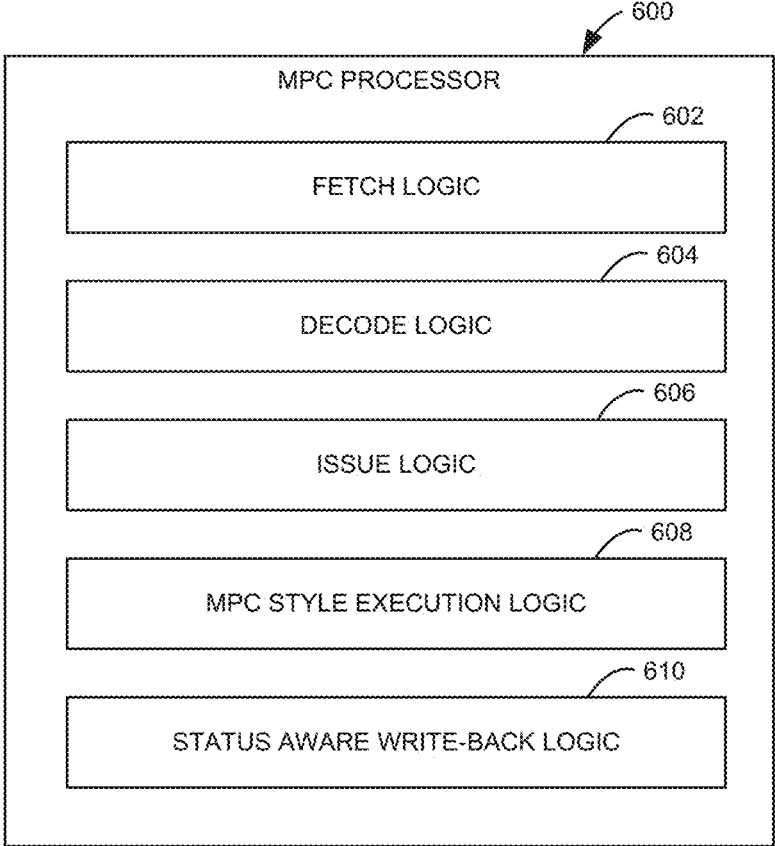
FIG. 6 is a block diagram illustrating one example of an MPC processor.

Below, a description of the bespoke MPC processor, one example of which is illustrated at 600 in FIG. 6, is provided.

The bespoke MPC processor architecture may employ a multistage (e.g., 5-stage) pipeline, consisting of Fetch logic 602, Decode logic 604, Issue logic 606, MPC style Execution logic 608, and Status aware Write-back logic 610. The Fetch logic 602 incorporates an elastic fetch unit capable of extracting multiple instructions until a fence instruction is encountered. The Decode logic 604 works in conjunction with the fetch stage to generate instruction groups. The Issue logic 606 is responsible for creating symbol table entries and dispatching instructions to the execute stage. The Execute logic 608 features a scoreboard that manages the overall execution status of an instruction group, facilitating the dispatch of instructions to the corresponding processing elements, namely the XOR-matrix, AND-matrix, and primitive library. In the write-back logic 610, as the status of all the bits of the result symbol are marked as done, the result is written back to the appropriate destination. In some examples, the 8-bit mode of the processor is used, employing a 16-bit addressing mode for symbols, and utilizing a symbol table with a size of 64 kB.

Figure 7:
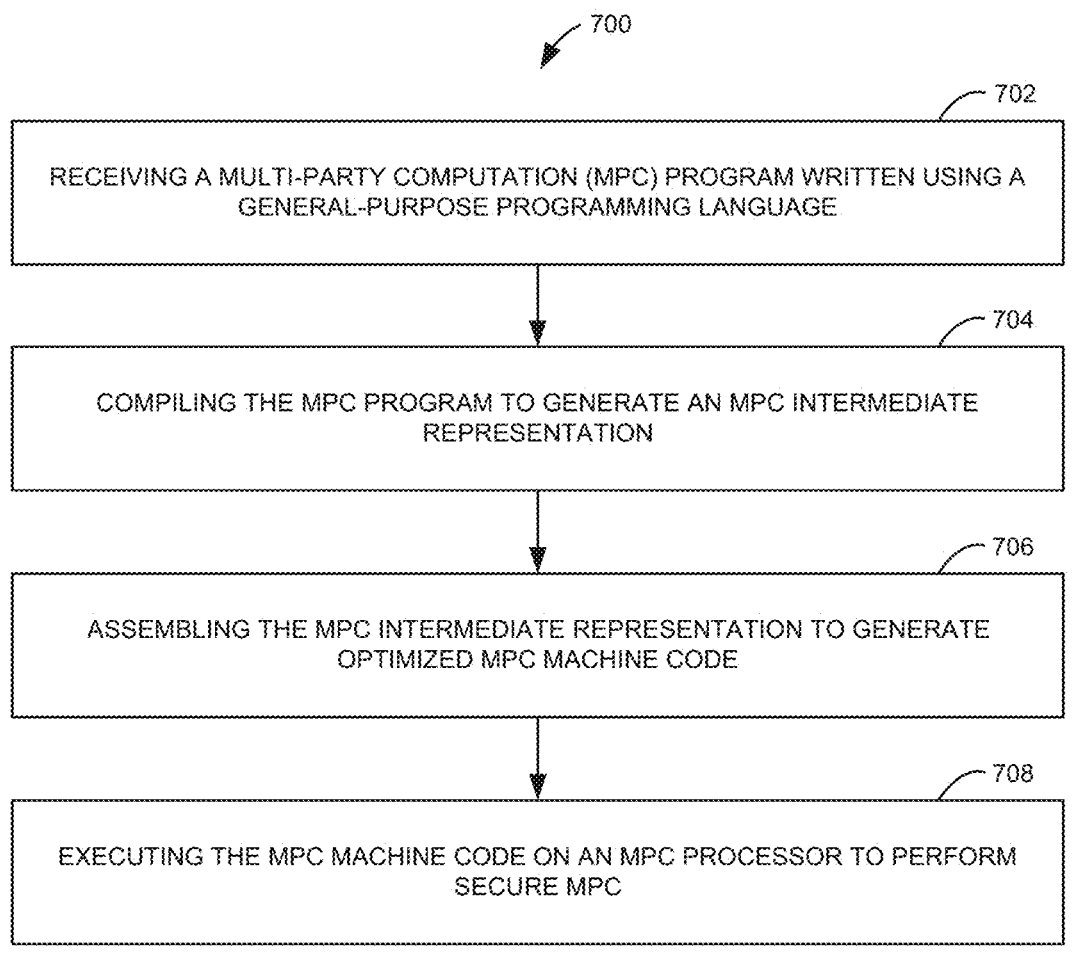
FIG. 7 is a flow diagram illustrating one example of a method for implementing MPC.

FIG. 7 is a flow diagram illustrating one example of a method 700 for implementing MPC. At 702, method 700 includes receiving a Multi-Party Computation (MPC) program written using a general-purpose programming language. In some examples, the general-purpose programming language includes a Python-based programming language to develop MPC applications. At 704, method 700 includes compiling the MPC program to generate an MPC intermediate representation. At 706, method 700 includes assembling the MPC intermediate representation to generate optimized MPC machine code. In some examples, assembling the MPC intermediate representation to generate optimized MPC machine code includes performing hardware-specific optimizations based on the intermediate representation and generating the optimized MPC machine code to reduce communication of parties. At 708, method 700 includes executing the MPC machine code on an MPC processor to perform secure MPC.

As previously described, in some examples, an Instruction Set Architecture (ISA) of the MPC processor comprises a symbol table partitioned for each section of a program space. In some examples, the ISA of the MPC processor includes an encoding scheme that facilitates variable-length instruction coding. The MPC processor, in some examples, enforces synchronization between parties involved in a computation for every bit in non-free gates. In some examples, the MPC processor includes a scheduler to route operands to a processing element. The MPC processor, in some examples, includes a scoreboard to track the progress of each bit of a hardware instruction group. In some examples, the MPC processor includes a dedicated processing element matrix for gate-level implementation of a plurality of structures for arithmetic and logical operations. The MPC processor, in some examples, includes a multistage (e.g., 5-stage) pipeline.

The disclosed MPC implementation significantly outperforms PCF for all benchmarks. In general the disclosed approach outperforms the software implementation by up to about 20000 times in runtime as with this approach the compilation of the circuit is decoupled using the MPC compiler. Alongside reaping the benefits of the compiler, additional performance benefits are achieved by significantly reducing the software overheads that stem from having to manage a laidout boolean circuit. The disclosed MPC implementation has an around 800 times improvement over an EMPToolkit implementation on a similar setup. The disclosed implementation improves performance by an additional 10 times.

It is to be understood that the features of the various exemplary embodiments described herein may be combined with each other, unless specifically noted otherwise.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A system for Multi-Party Computation (MPC), the system comprising:

a general-purpose programming language for writing an MPC application;

an MPC processor for executing the MPC application;

an MPC Instruction Set Architecture (ISA) corresponding to the MPC processor; and a compiler to generate an intermediate representation for the MPC application and to generate machine code for the intermediate representation by mapping and assembling MPC ISA instructions, wherein the MPC processor enforces synchronization between parties involved in a computation for every bit in non-free gates.

2. The system of claim 1, wherein the Instruction Set Architecture (ISA) comprises a symbol table partitioned for each section of a program space.

3. The system of claim 1, wherein the Instruction Set Architecture (ISA) comprises an encoding scheme that facilitates variable-length instruction coding.

4. The system of claim 1, wherein the MPC processor comprises a scheduler to route operands to a processing element.

5. The system of claim 1, wherein the MPC processor comprises a scoreboard to track the progress of each bit of a hardware instruction group.

6. The system of claim 1, wherein the MPC processor comprises a dedicated processing element matrix for gate-level implementation of a plurality of structures for arithmetic and logical operations.

7. The system of claim 1, wherein the MPC processor comprises logic minimizing a number of gates that require communication.

8. The system of claim 1, wherein the general-purpose programming language comprises a Python-based programming language to develop MPC applications.

9. A method comprising:

receiving a Multi-Party Computation (MPC) program written using a general-purpose programming language;

compiling the MPC program to generate an MPC intermediate representation;

assembling the MPC intermediate representation to generate optimized MPC machine code; and executing the MPC machine code on an MPC processor to perform secure MPC, wherein the MPC processor enforces synchronization between parties involved in a computation for every bit in non-free gates.

10. The method of claim 9, wherein an Instruction Set Architecture (ISA) of the MPC processor comprises a symbol table partitioned for each section of a program space.

11. The method of claim 9, wherein an Instruction Set Architecture (ISA) of the MPC processor comprises an encoding scheme that facilitates variable-length instruction coding.

12. The method of claim 9, wherein the MPC processor comprises a scheduler to route operands to a processing element.

13. The method of claim 9, wherein the MPC processor comprises a scoreboard to track the progress of each bit of a hardware instruction group.

14. The method of claim 9, wherein the MPC processor comprises a dedicated processing element matrix for gate-level implementation of a plurality of structures for arithmetic and logical operations.

15. The method of claim 9, wherein assembling the MPC intermediate representation to generate optimized MPC machine code comprises performing hardware-specific optimizations based on the intermediate representation and generating the optimized MPC machine code to reduce communication of parties.

16. The method of claim 9, wherein the general-purpose programming language comprises a Python-based programming language to develop MPC applications.

* * * * *